US012462614B2

(12) United States Patent
Bucci

(10) Patent No.: US 12,462,614 B2
(45) Date of Patent: Nov. 4, 2025

(54) LOTTERY TICKET VENDING MACHINE

(71) Applicant: Brightstar Global Solutions Corporation, Providence, RI (US)

(72) Inventor: Paul A Bucci, Glocester, RI (US)

(73) Assignee: Brightstar Global Solutions Corporation, Providence, RI (US)

( * ) Notice: Subject to any disclaimer, the term of this patent is extended or adjusted under 35 U.S.C. 154(b) by 357 days.

(21) Appl. No.: 18/328,293

(22) Filed: Jun. 2, 2023

(65) Prior Publication Data

US 2024/0404324 A1 Dec. 5, 2024

(51) Int. Cl.

| | |
|---|---|
| ***G07B 5/02*** | (2006.01) |
| ***G07B 3/02*** | (2006.01) |
| ***G07B 3/04*** | (2006.01) |
| ***G07C 15/00*** | (2006.01) |
| ***G07F 17/32*** | (2006.01) |

(52) U.S. Cl.

CPC ................ *G07B 5/02* (2013.01); *G07B 3/02* (2013.01); *G07B 3/04* (2013.01); *G07C 15/005* (2013.01); *G07F 17/329* (2013.01)

(58) Field of Classification Search

CPC ... G07B 3/02; G07B 3/04; G07B 5/02; G07C 15/005; G07F 17/42

See application file for complete search history.

(56) References Cited

U.S. PATENT DOCUMENTS

| | | | |
|---|---|---|---|
| 3,855,457 A | 12/1974 | Amundson et al. | |
| 5,222,624 A | 6/1993 | Burr | |
| 5,408,417 A | 4/1995 | Wilder | |
| 5,547,061 A * | 8/1996 | Itako | G07F 1/044 194/207 |
| 5,836,498 A | 11/1998 | Turek | |
| 5,844,682 A * | 12/1998 | Kiyomoto | G01N 21/21 356/73.1 |
| 6,609,644 B1 | 8/2003 | Menna | |
| 6,712,253 B2 | 3/2004 | Hargrave et al. | |
| 6,714,838 B2 | 3/2004 | Scrymgeour et al. | |
| 6,726,077 B2 | 4/2004 | Roberts et al. | |
| 7,032,774 B2 | 4/2006 | Boehm et al. | |
| 7,383,099 B2 | 6/2008 | Pollard et al. | |
| 7,562,798 B2 | 7/2009 | Bartolone et al. | |
| 7,665,394 B2 | 2/2010 | Roberts et al. | |
| 7,850,257 B2 | 12/2010 | Roberts et al. | |
| 8,127,973 B2 | 3/2012 | Mirkovic et al. | |
| 8,192,268 B1 | 6/2012 | Karpe | |
| 8,210,921 B1 | 7/2012 | Karpe | |

(Continued)

FOREIGN PATENT DOCUMENTS

| | | |
|---|---|---|
| CN | 112184984 A | 1/2021 |
| WO | 2016184336 A1 | 11/2016 |

OTHER PUBLICATIONS

"Extended European Search Report", from corresponding European Patent Application No. 24179244.9, Oct. 30, 2024.

*Primary Examiner* — Robert E Mosser

(74) *Attorney, Agent, or Firm* — Neal, Gerber & Eisenberg LLP

(57) ABSTRACT

A lottery ticket vending machine configured to determine if lottery tickets received by a ticket burster from a ticket drawer of a ticket drawer column are connected by tape, and to take one or more actions if such lottery tickets are connected by tape. In various embodiments, each of the tickets bursters includes a suitable tape sensor.

20 Claims, 8 Drawing Sheets

(56) References Cited

U.S. PATENT DOCUMENTS

| | | | |
|---|---|---|---|
| 8,534,524 | B2 | 9/2013 | Businger et al. |
| 8,550,294 | B2 | 10/2013 | Martin |
| 9,613,337 | B1 | 4/2017 | Garrison |
| 9,685,026 | B1 | 6/2017 | Garrison |
| 10,438,452 | B2 | 10/2019 | Ferron et al. |
| 11,010,987 | B2 | 5/2021 | Bucci |
| 2003/0120381 | A1 | 6/2003 | Perin et al. |
| 2004/0000572 | A1 | 1/2004 | Engelhardt, Jr. et al. |
| 2005/0178810 | A1 | 8/2005 | Woods et al. |
| 2007/0017978 | A1 | 1/2007 | Ho |
| 2007/0088459 | A1 | 4/2007 | Pollard et al. |
| 2010/0308071 | A1 | 12/2010 | Businger |
| 2014/0008407 | A1 | 1/2014 | Bucci et al. |
| 2016/0232741 | A1 | 8/2016 | Assis et al. |
| 2017/0015489 | A1* | 1/2017 | Martineck, Sr. ...... B65B 61/182 |
| 2018/0186558 | A1 | 7/2018 | Mejenborg et al. |
| 2022/0108562 | A1 | 4/2022 | Claude et al. |
| 2022/0114842 | A1 | 4/2022 | Mejenborg et al. |
| 2022/0114860 | A1 | 4/2022 | Mejenborg et al. |
| 2024/0021054 | A1 | 1/2024 | Topalian et al. |
| 2024/0404370 | A1* | 12/2024 | Topalian ................ B26F 3/002 |

* cited by examiner

LOTTERY TICKET VENDING MACHINE

BACKGROUND

The present disclosure relates to lottery ticket vending machines.

Lottery tickets such as instant lottery tickets may be printed on a strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket vending machine including: a housing; a ticket drawer column in the housing, the ticket drawer column including a plurality of ticket drawers, each of the ticket drawers configured to hold one or more strips of lottery tickets; a ticket burster in the housing, the ticket burster defining a ticket inlet and a ticket outlet, the ticket burster movable to a plurality of different ticket receipt positions, each different ticket receipt position associated with and in alignment with a different one of the ticket drawers; a tape sensor supported by the ticket burster, configured to obtain data for adjacent lottery tickets that move from one of the ticket drawers into the ticket burster, and configured to transmit the data; and a controller. The controller is configured to receive the data from the tape sensor, determine if tape is connected to the adjacent lottery tickets and cause an action to be taken responsive to determining that the tape is connected to the lottery tickets.

In various other embodiment, the present disclosure relates to a lottery ticket vending machine including: a housing; a ticket drawer column in the housing, the ticket drawer column including a plurality of ticket drawers, each of the ticket drawers configured to hold one or more strips of lottery tickets; a ticket burster in the housing, the ticket burster defining a ticket inlet and a ticket outlet, the ticket burster movable to a plurality of different ticket receipt positions, each different ticket receipt position associated with and in alignment with a different one of the ticket drawers; a ticket cutter supported by the ticket burster; a tape sensor supported by the ticket burster, configured to obtain data for adjacent lottery tickets that move from one of the ticket drawers into the ticket burster, and configured to transmit the data, wherein the tape sensor includes one of a camera and an optical sensor, wherein the tape sensor is positioned in the ticket burster such that the tape sensor can sense tape connecting the adjacent lottery tickets before the cutter cuts the tape connecting the adjacent lottery tickets; and a controller. The controller is configured to receive the data from the tape sensor, determine if the adjacent lottery tickets are connected by the tape based on the data, and cause an action to be taken responsive to determining that the lottery tickets are connected by tape.

In various other embodiments, the present disclosure relates to a lottery ticket vending machine including: a housing; a lottery ticket drawer supported by the housing; a ticket burster supported by the housing; a sensor supported by the housing; and a controller supported by the housing. The controller is configured to operate with the sensor to determine if a first lottery ticket is connected to a second lottery ticket by tape, and to cause an action to be taken responsive to determining that the first and second lottery tickets are connected by tape.

Additional features are described in, and will be apparent from, the following Detailed Description and the figures.

DETAILED DESCRIPTION

Figure 1A:
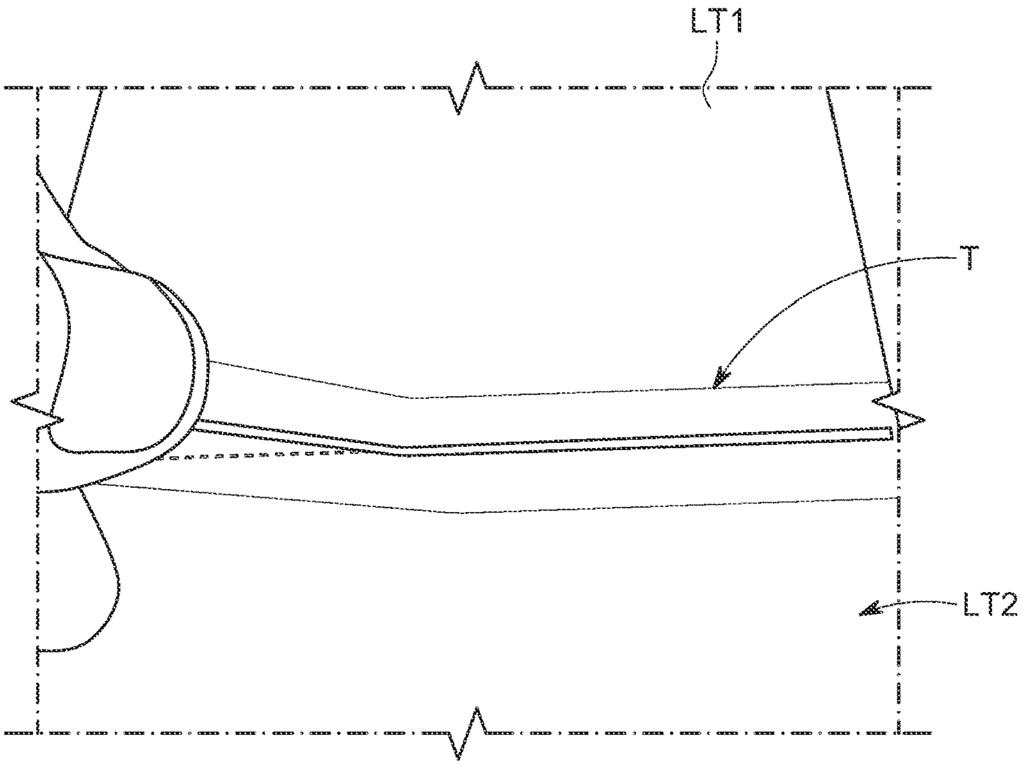
FIGS. 1A and 1B are diagrammatic views of parts of two lottery tickets of two strips of lottery tickets that are connected by a piece of tape.

In various embodiments, the present disclosure relates to a lottery ticket vending machine that is configured to determine if the lottery tickets received from its ticket drawers of its ticket drawer columns are connected by tape, and if so, to take an action regarding such tape such as but not limited to creating and sending an alert regarding such tape and/or such lottery tickets being connected by tape.

In various example embodiments, each of the ticket bursters of the lottery ticket vending machine includes one or more tape sensors configured to directly detect tape that is connecting adjacent lottery tickets that are received in the ticket burster. This can be considered a relatively direct determination.

In various other example embodiments, each of the ticket bursters of the lottery ticket vending machine includes one or more tape sensors configured to obtain one or more images of an edge area of adjacent lottery tickets to enable the controller(s) of the lottery ticket vending machine to determine of adjacent lottery tickets are connected by tape. This can be considered a somewhat indirect determination.

In various embodiments, the lottery ticket vending machine includes one or more controllers configured to receive data from the tape sensor(s), use, and/or analyze such data, and make such determinations regarding any actions to be taken such as alerts to be created and transmitted based on such determinations.

For a better understanding of the present disclosure, example instant lottery tickets are first generally described herein.

Various known instant lottery tickets are single game instant lottery tickets. An example single game instant lottery ticket can include: (1) a ticket substrate have a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket codes (such as barcodes), and other instant lottery ticket information that is in human readable and machine readable forms. Certain of this instant lottery ticket information: (a) identifies the instant lottery ticket; (b) the set, run, and/or pack of instant lottery tickets that the instant lottery ticket is part of; and (c) other inventory control information. Various known single game instant lottery tickets include multiple predefined scratch-off areas, multiple sets of variable lottery game indicia printed on the predefined scratch-off areas, and multiple SOCs covering the variable lottery game indicia sets. Various known instant lottery tickets are multi-game instant lottery tickets and can be larger than single game tickets. Instant lottery tickets can also be of the known pull tab type. Instant lottery tickets can have a width that varies from 2 to 4 inches and a length that varies from 2 to 12 inches. The term lottery ticket as used herein is intended to cover these various different types and other types of lottery tickets that can be dispensed in a same or similar manner as these types of lottery tickets.

Various lottery tickets are often arranged after manufacture (which includes after complete printing) in lottery ticket packs for storage, organization, sorting, picking, shipping to lottery ticket distributors or ticket retailers, and validation. Instant lottery ticket packs can include a plurality of lottery tickets (that are all of the same type, same size, and for the same game(s), and can be protected for storage and shipping by a transparent pack wrapping, such as transparent plastic wrapping, securely wrapped around the plurality of lottery tickets. A pack of lottery tickets can include all of the lottery tickets connected to each other but joined by perforations. Such lottery tickets of a pack can be detached from each other along such perforations. While tickets of each pack are often manufactured in a continuous strip that is fan-folded for convenient supply, the packs can be in other forms such as in a roll form. These packs in the fan-folded form or in the roll form are configured to dispensing via a lottery ticket vending machine.

In various situations, adjacent lottery tickets can be connected by tape. One situation occurs when two lottery tickets of a strip are separated, and an operator reconnects such lottery tickets using a strip of tape. In this situation, the tape is used to fix a broken pack. Another situation occurs when two strips of the lottery tickets for the same lottery game are connected together by an operator using a strip of tape. In this situation, the tape is used to connect to pack of the same lottery game. Another situation occurs when two strips of the lottery tickets for different lottery games are connected together by an operator using a strip of tape. Thus, in such example situations, the strips and thus the lottery tickets connected by the tape can be lottery tickets for the same game or for different lottery games.

Figure 1B:
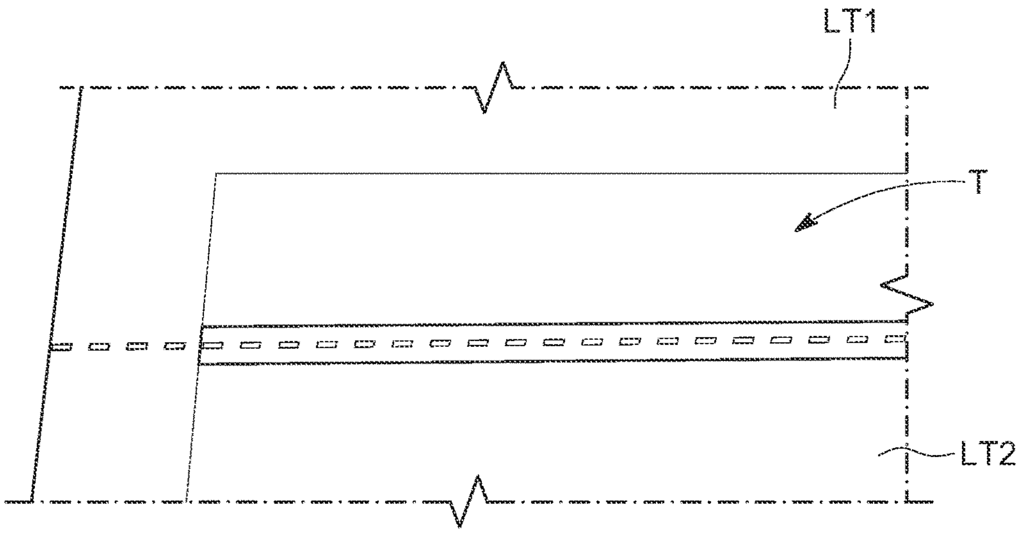

FIGS. 1A and 1B show parts of two adjacent lottery tickets LT1 and LT2 of two strips and of lottery tickets. Each strip has multiple connected lottery tickets (not shown) respectively connected at perforated areas. In this example, lottery ticket LT1 is a leading lottery ticket in a first strip and has a leading edge (not labeled), and lottery ticket LT2 is a trailing lottery ticket in a second strip and has a trailing edge (not labeled). These two lottery tickets LT1 and LT2 are connected by a piece of tape T such that the leading edge of lottery ticket LT1 is adjacent to the trailing edge of lottery ticket LT2. The tape T can include one or more tape indicators such as a solid line, a dotted line, or one or more suitable colors. The indicators can function a targets to be sensed by the tape sensors as described below. FIG. 1A shows part of a hand (not labeled) of a person (not shown) applying the tape T to the lottery tickets LT1 and LT2. FIG. 1B shows part of the tape T applied and parts of the lottery tickets LT1 and LT2.

Various embodiments of the present disclosure thus provide a lottery ticket vending machine that obtains data regarding the edge area of two adjacent lottery tickets. This data can directly indicate the presence of the tape or can be configured to be analyzed to determine if any tape is in the edge area. Based on the data, one or more actions can be taken. It should be appreciated that these actions taken can be suitably tracked and stored (such as by the controller or a remote system) for future reference and use.

Turning now to FIGS. 2, 3, 4, 5, 6, 7, and 8, a lottery ticket vending machine of one example embodiment of the present disclosure is generally illustrated and indicated by numeral 100. The lottery ticket vending machine 100 may be referred to herein as the "ticket vending machine" or the "vending machine" for brevity.

The illustrated example ticket vending machine 100 includes: (a) a machine housing 110 including a front door 200; (b) three ticket drawer columns 300*a*, 300*b*, and 300*c* positioned in and supported by the machine housing 110; and (c) three separate and independently movable ticket bursters 400*a*, 400*b*, and 400*c* positioned in the machine housing 110 and supported by burster supports (not labeled) positioned in and supported by the machine housing 110. The front door 200 includes a ticket collection receptacle 250 configured to receive separated lottery tickets from each of the ticket bursters 400*a*, 400*b*, and 400*c*. The quantity, positions, sizes, and configurations of the ticket drawer columns and the ticket bursters can vary in accordance with the present disclosure.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic component holder (not labeled) positioned in and supported by the machine housing 110; and (2) various purchaser interface components (not labeled) that are part of the front door 200 of the machine housing 110. These components are only briefly described herein for brevity. Such electronic components can be arranged in any suitable manner. The electronic component holder can be in the form or a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers that control the operation of the ticket vending machine 100 including the movable ticket bursters 400*a*, 400*b*, and 400*c* as further discussed herein to facilitate the dispensing of each requested lottery ticket and the determination of any deformities in the edges of the lottery tickets (as further described below). The controller(s) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) store(s) instructions executable by the processing device(s) to control operation of the ticket vending machine 100. The purchaser interface components include one or more display devices, one or more input devices, and one or more payment acceptors. The purchaser interface components enable purchasers to use such components to determine the lottery tickets available from the ticket vending machine 100, and to select and pay for any of those lottery tickets held by the ticket vending machine 100 that the purchaser desires to obtain. The purchaser interface components can display images and information to inform purchasers of the different lottery tickets available from the ticket vending machine 100 and to assist in completing the selection and purchase of such lottery tickets. These electronic components and purchaser interface components can take many different forms as well known in the industry, and are thus not described in detail herein for brevity.

Figure 2:
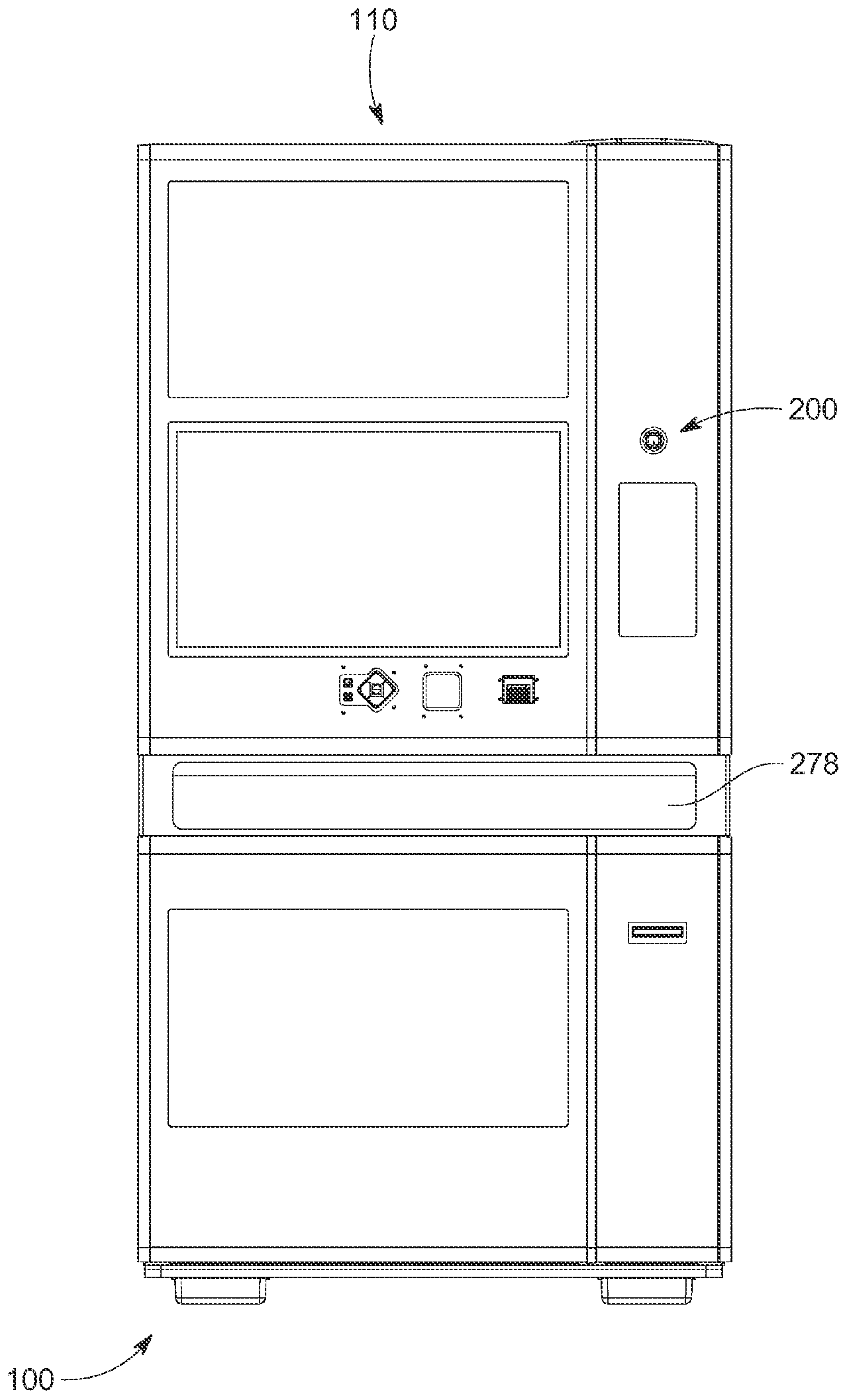
FIG. 2 is a front perspective view of a lottery ticket vending machine of one example embodiment of the present disclosure shown with a front door thereof in a closed position.
Figure 3:
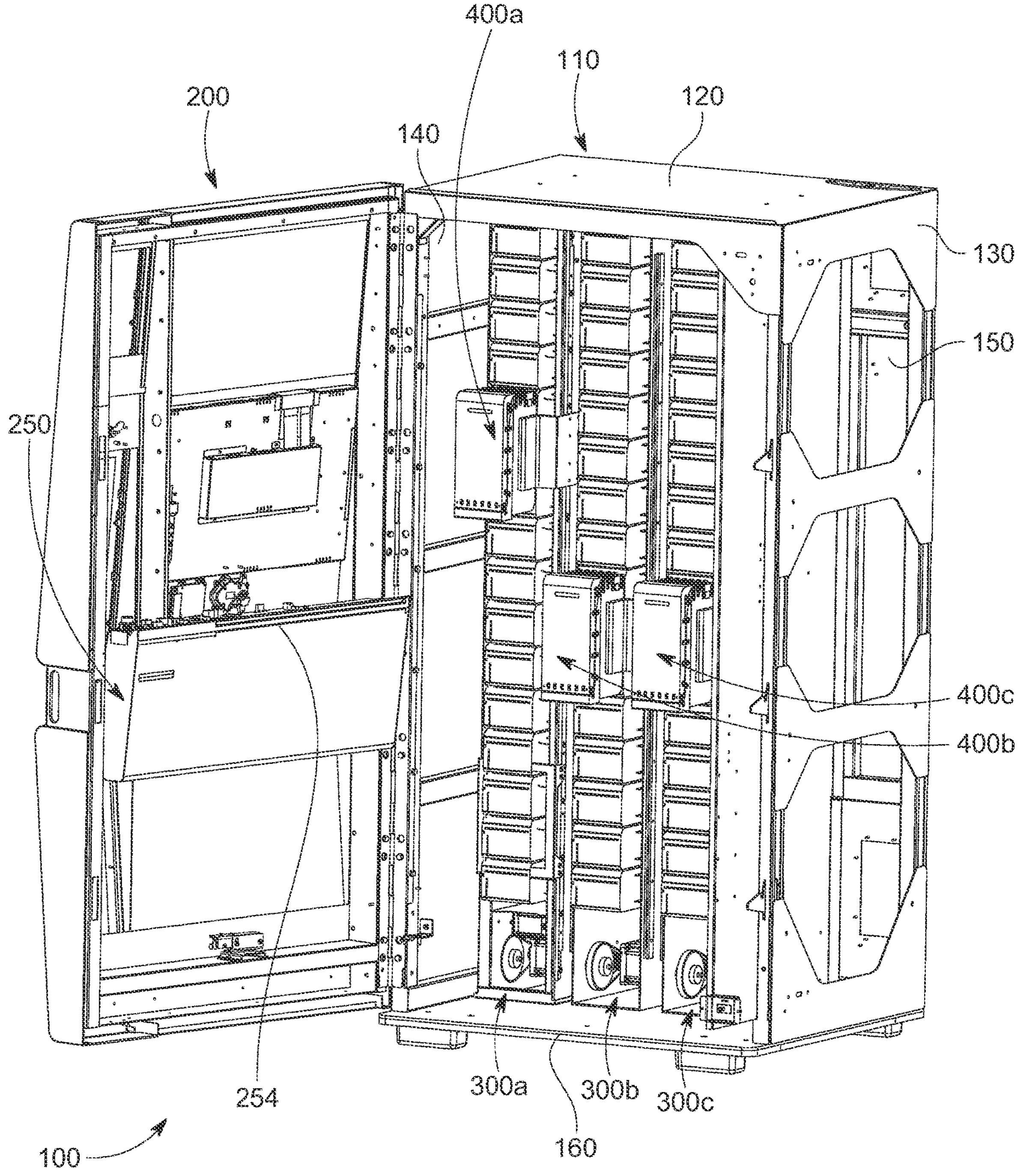
FIG. 3 is a front perspective view of the lottery ticket vending machine of FIG. 2 shown with the front door thereof in an open position, shown with a left side wall panel thereof removed, showing three ticket drawer columns and three movable ticket bursters respectively associated the three ticket drawer columns, and showing a ticket collection receptacle of the front door.
Figure 4:
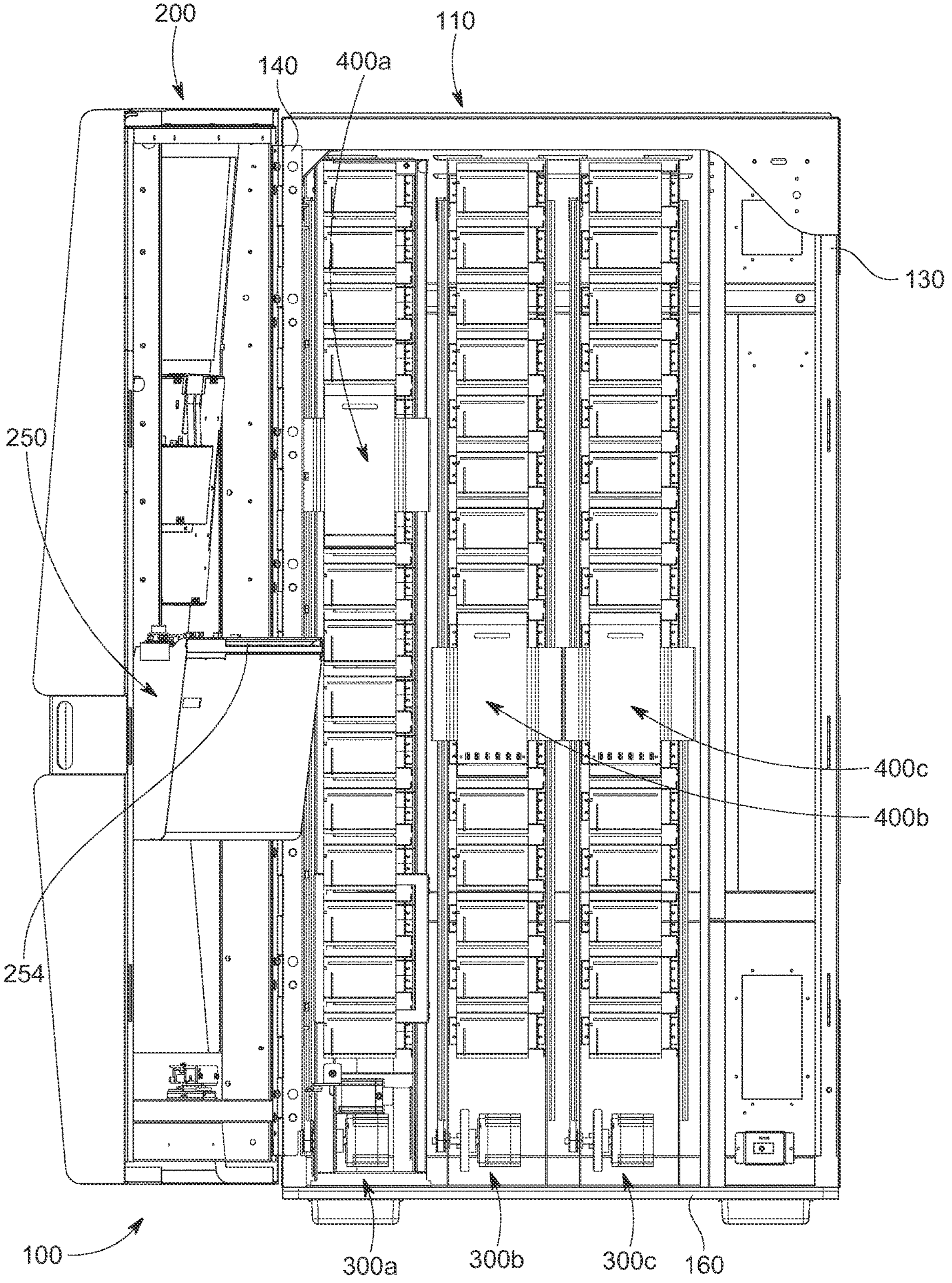
FIG. 4 is a front view of the lottery ticket vending machine of FIG. 2 shown with the front door thereof in the open position, shown with the left side wall panel thereof removed, showing the three ticket drawer columns and the three movable ticket bursters respectively associated the three ticket drawer columns, and showing the ticket collection receptacle of the front door.

In this illustrated example embodiment, the machine housing 110 includes a top wall 120, spaced-apart side walls 130 and 140, a rear wall 150, a base 160, and the openable front door 200 pivotally connected to the side wall 140. The base 160 is configured to rest on a floor or other suitable support. The machine housing 110 includes suitable vertically extending supports (not labeled) configured to hold and support the respective ticket drawer columns 300*a*, 300*b*, and 300*c*. The front door 200 is moveable from a closed and locked position covering the open front face of the machine housing 110 as shown in FIG. 2 to an open position allowing access to the interior of the machine housing 110 as shown in FIGS. 3 and 4. The front door 200 is mounted by hinges (not labeled) to the side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components (such as those described below). The size and configuration of the machine housing can vary in accordance with the present disclosure.

The ticket collection receptacle 250 of the front door 200 is configured to receive lottery tickets from each of the movable ticket bursters 400*a*, 400*b*, and 400*c*. The ticket collection receptacle 250 is configured to hold each lottery ticket received from the movable ticket bursters to enable the respective purchaser to retrieve the dispensed lottery ticket from the ticket collection receptacle 250. The ticket collection receptacle defines an elongated horizontally extending ticket receiving slot 254 (best seen in FIGS. 3 and 4). The ticket collection receptacle 250 and the front door define an elongated horizontally extending purchase ticket retrieval slot 278 (best seen in FIG. 2). The purchase ticket retrieval slot 278 is (and needs to be) large enough so that a purchaser can insert the purchaser's hand through the purchase ticket retrieval slot 278 to retrieve lottery tickets that are dispensed into the ticket collection receptacle 250. The ticket receiving slot 254 is (and needs to be) small enough so that a purchaser cannot insert the purchaser's hand through the ticket receiving slot 254 and thereby cannot access any of the ticket drawers of the ticket drawer columns 300*a*, 300*b*, or 300*c*. The position, size, and configuration of the ticket collection receptacle can vary in accordance with the present disclosure.

Each of the ticket drawer columns 300*a*, 300*b*, and 300*c* are identical in this example embodiment. For brevity, only ticket drawer column 300*a* is described in detail herein. Likewise, the three movable ticket bursters 400*a*, 400*b*, and 400*c* are identical in this example embodiment. For brevity, only ticket burster 400*a* associated with the ticket drawer column 300*a* is described herein.

Ticket drawer column 300*a* includes a series of aligned ticket drawers (not individually labeled) that are vertically stacked in the column. Each of the ticket drawers is configured to hold one or more packs of lottery tickets (such as instant lottery tickets) for subsequent dispensing by the ticket vending machine 100. The ticket drawers can vary in quantity, size, and configuration depending upon the particular size of the ticket vending machine 100 and the quantity, size, and shapes of the lottery tickets that the ticket vending machine 100 can or will dispense. Each ticket drawer is configured to hold lottery tickets (such as instant lottery tickets) for selection by the purchasers. In various embodiments, the different ticket drawers can hold different lottery ticket packs for different lottery games, but it should be appreciated, that two or more ticket drawers can hold the same type of lottery tickets. In various embodiments, each of the ticket drawers is configured to feed each lottery ticket held by that ticket drawer into the associated ticket burster 400*a* when the ticket burster 400*a* is moved into alignment with such ticket drawer for receipt, bursting, and dispensing of that lottery ticket. Bursting of the lottery ticket is the industry term for separating a lottery ticket from a pack of lottery tickets held in a ticket drawer. In this example embodiment, the ticket drawers do not burst the lottery tickets and do not need any mechanisms for bursting the lottery tickets, but rather the moveable ticket burster 400*a* bursts the lottery tickets fed by the ticket drawers in the ticket drawer column 300*a* into that ticket burster 400*a*.

Figure 5:
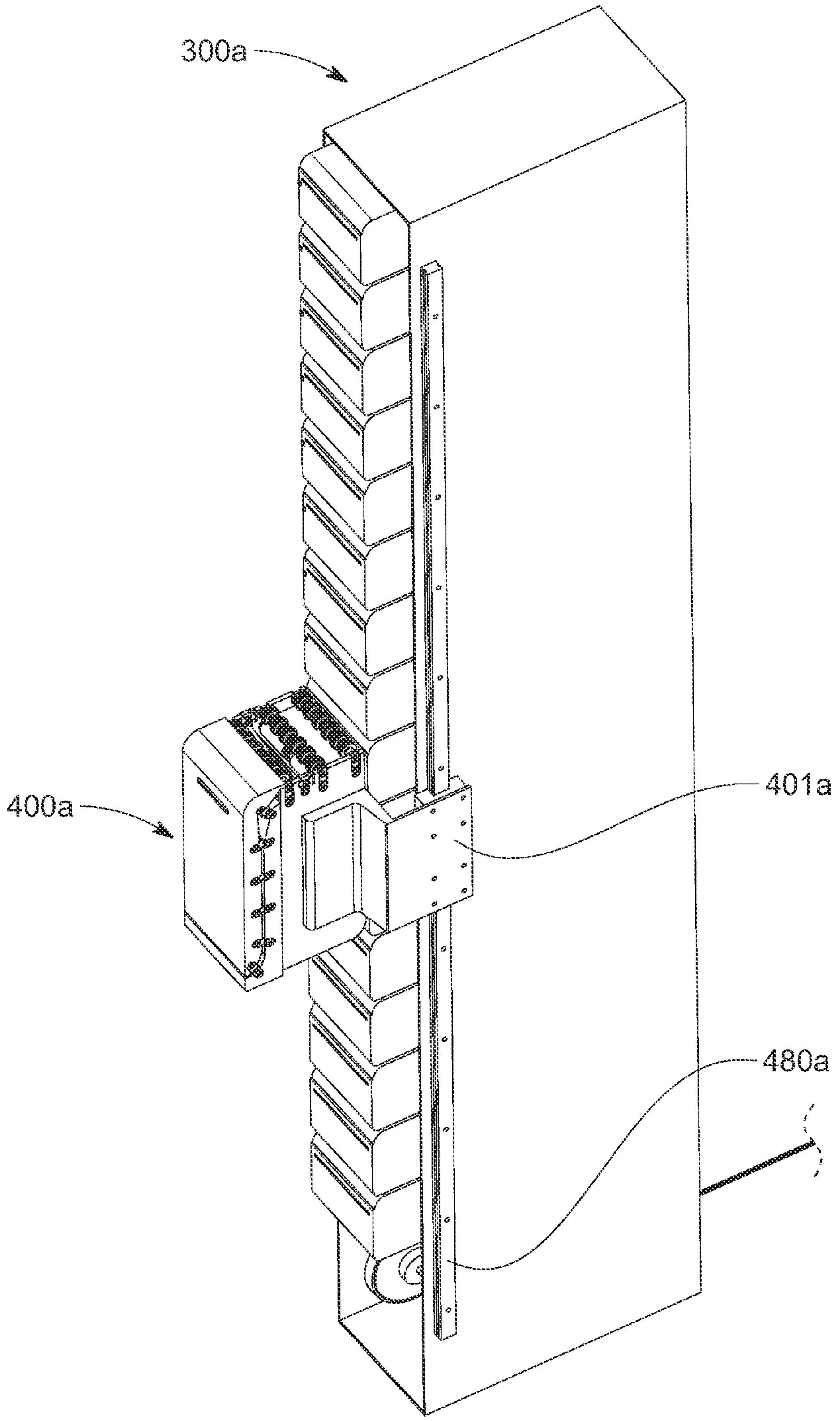
FIG. 5 is an enlarged perspective view of one of the ticket drawer columns and the ticket burster associated with that ticket drawer column of the lottery ticket vending machine of FIG. 2.
Figure 6:
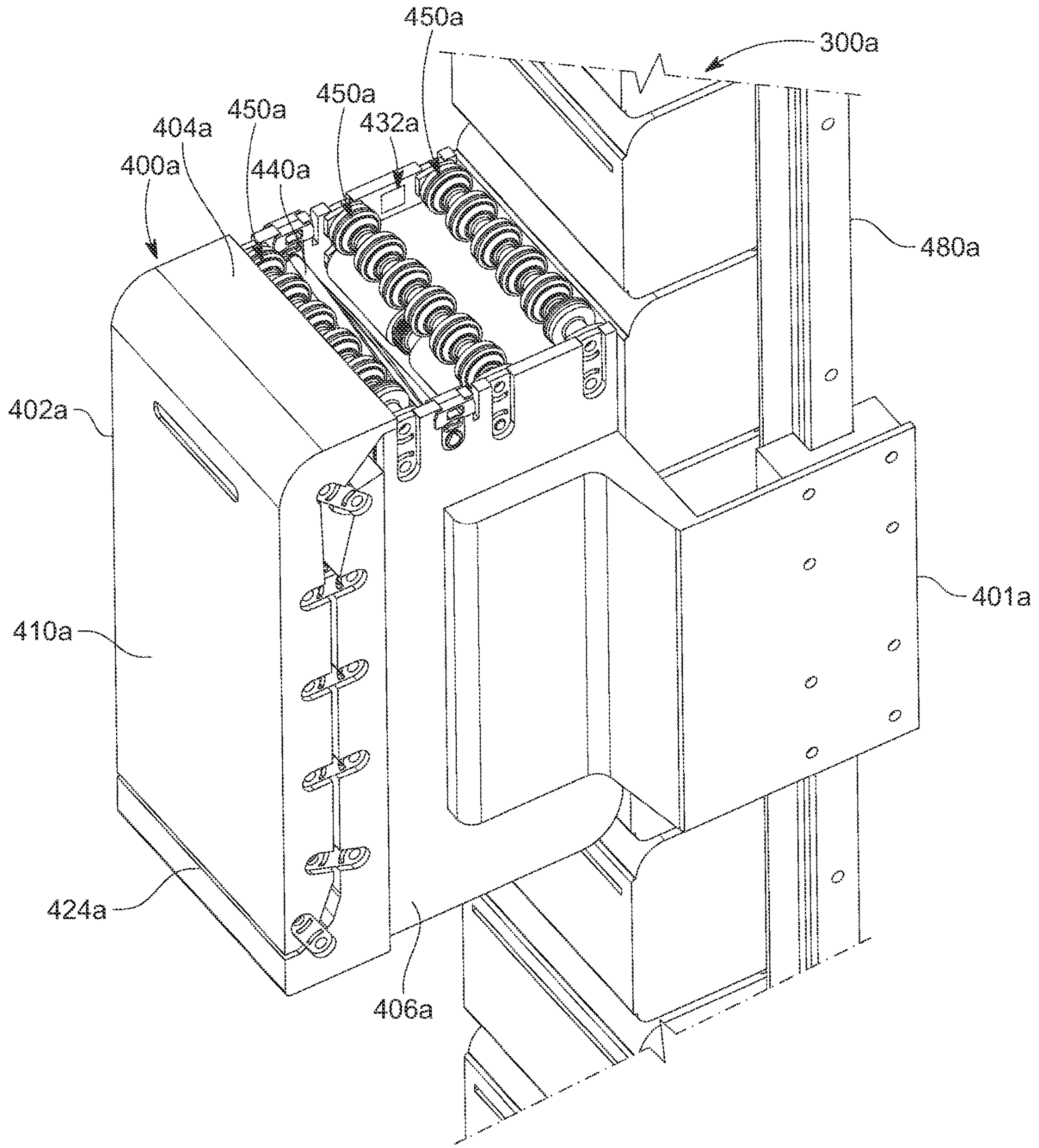
FIG. 6 is in enlarged fragmentary top perspective view of the ticket drawer column and the ticket burster of FIG. 5.
Figure 7:
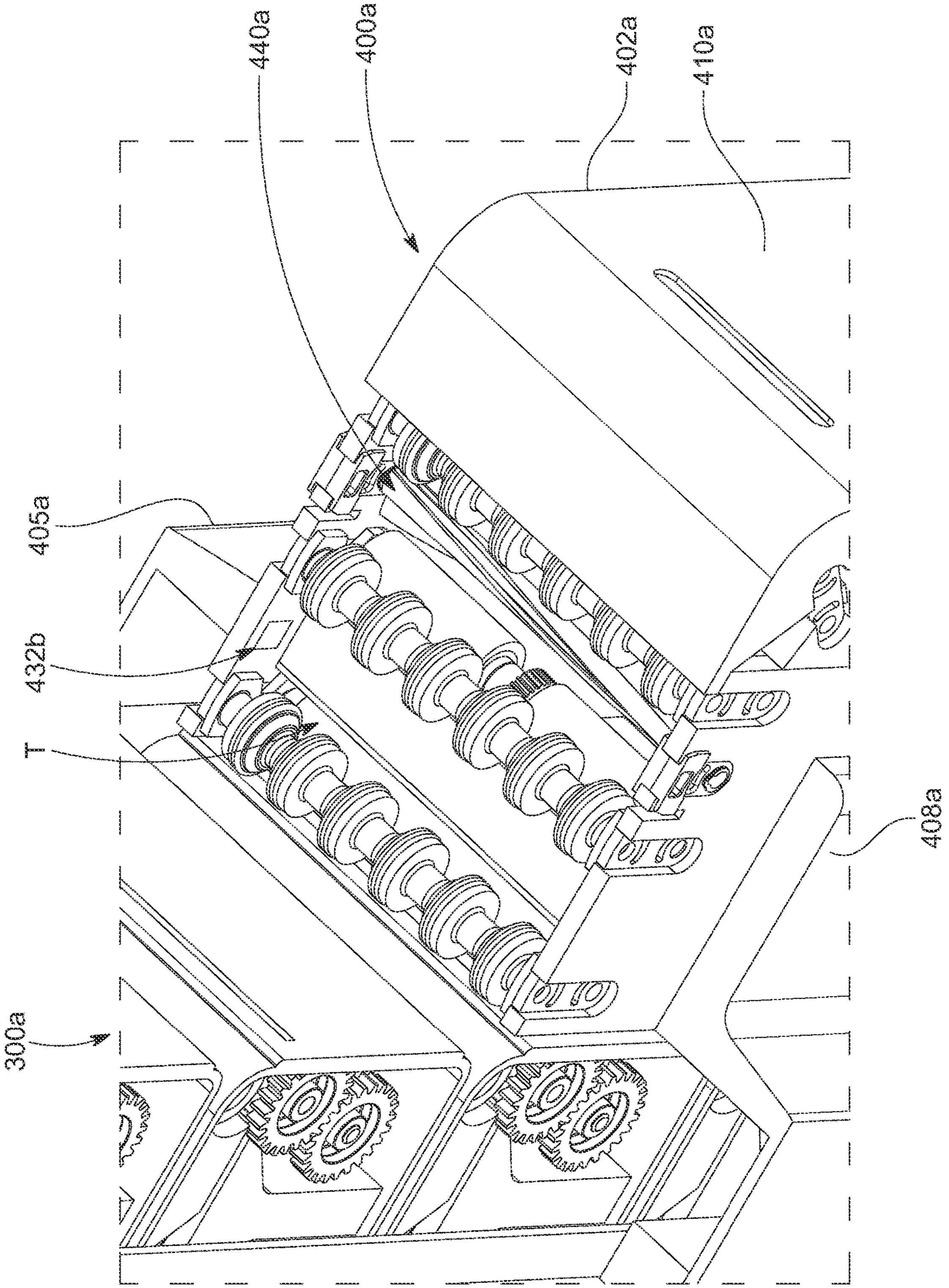
FIG. 7 is an enlarged fragmentary top view of the ticket drawer column and the ticket burster of FIG. 5.
Figure 8:
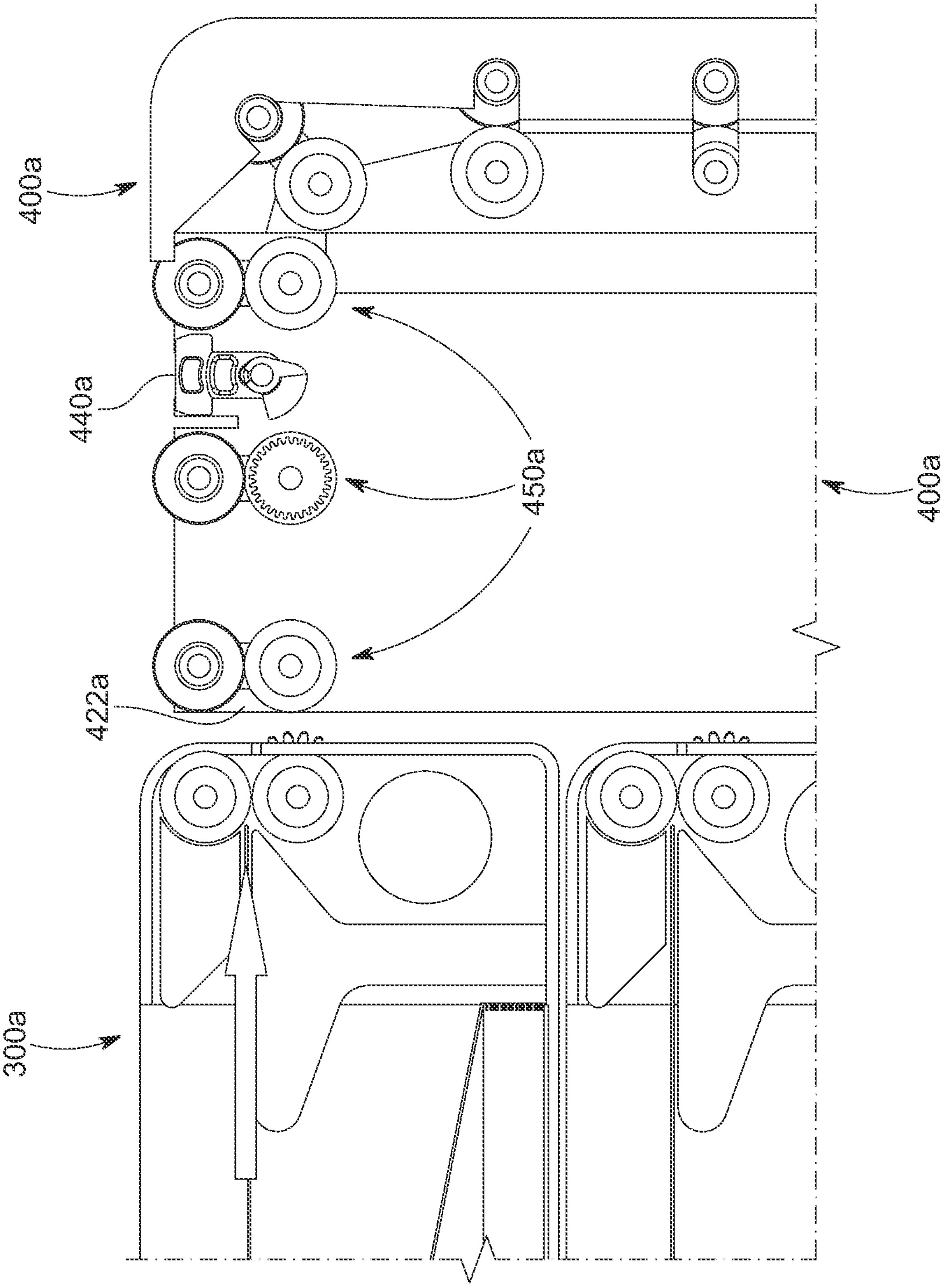
FIG. 8 is a further enlarged fragmentary side view of the ticket drawer column and the ticket burster of FIG. 5.

As best shown in FIGS. 3, 4, and 5, the movable ticket burster 400*a* is supported by one or more burster supporters (such as burster supporter 480*a*). The burster supporters can be any suitable structure(s) that support(s) the ticket burster 400*a* in a manner that enables the ticket burster 400*a* to vertically move to any of the different ticket receipt positions that are associated with and in alignment with the respective ticket drawers of the ticket drawer column 300*a*. Each of the burster supporters also support the ticket burster 400*a* in a manner that enables the ticket burster 400*a* to vertically move to into alignment with the ticket receptacle 250.

The ticket vending machine 100 includes one or more actuators (not shown) that control movement of the ticket burster 400*a* under control of the controller of the ticket vending machine 100 and/or the controller of the ticket burster 400*a*. In this example, an actuator (not labeled) is mounted at the bottom of the ticket drawer column 300*a* and coupled to the ticket burster 400*a* by suitable linkages (such as but not limited to pulleys and a drive belt (not labeled)). The actuator is configured to move the ticket burster 400*a* under the control of the controller(s) in the vertical (e.g., up and down) directions. The movable ticket burster 400*a* is thus moveable, via this actuator and linkages on the ticket burster supporters to different vertical locations including a plurality of the locations respectively associated and aligned with each of the ticket drawers of the ticket drawer column 300*a* such that the ticket burster 400*a* is positioned to receive one or more of the lottery tickets stored in each respective ticket drawer of the ticket drawer column 300*a* for obtaining and dispensing that lottery ticket into the ticket receptacle 400 for the purchaser as requested by the purchaser.

As best shown in FIGS. 5, 6, 7, and 8, this example movable ticket burster 400*a* generally includes: (a) a burster housing 402*a*; (b) one or more burster supporter connecters (such as burster support connector 404*a* connecting the burster housing 402*a* and the burster supporter 480*a*); (c) first and second tape sensors 432*a* and 432*b* supported by the burster housing 402*a*; (d) a ticket cutter 440*a* supported by the burster housing 402*a*; (e) a plurality of ticket engagers 450*a* supported by the burster housing 402*a*; and (f) a burster controller (not shown). The size and configuration of the ticket burster can vary in accordance with the present disclosure. While this example includes two tape sensors, as further discussed below, the quantity of tape sensors and the position of the tape sensor(s) in the buster can vary in accordance with the present disclosure.

More specifically, the burster housing 402*a* generally includes a top member 404*a*, spaced-apart side members 406*a* and 408*a*, a front member 410*a*, a rear member 412*a*, and a bottom member 414*a*. The burster housing 402*a* also includes a plurality of internal members (not individually labeled) that define a ticket inlet 422*a*, through which the ticket burster 400*a* is configured to receive lottery tickets (such as connected lottery tickets LT1 and LT2 as further explained below) from a ticket drawer of the ticket drawer column 300*a*, a ticket outlet 424*a* through which the ticket burster 400*a* is configured to dispense the received lottery tickets into the ticket collection receptacle 250, and a ticket movement path (not labeled) extending from the ticket inlet 422*a* to the ticket outlet 424*a* and through which each lottery ticket is moved through the ticket burster 400*a*.

The ticket cutter 440*a* is positioned in the burster housing 402*a* and configured to rotate to cut the perforations or tape connecting each lottery ticket that moves along the ticket movement path in the ticket burster 400*a* to the next lottery ticket of the strip or strips of lottery tickets received from the respective ticket drawer. The ticket cutter 440*a* is configured to make such cut along the perforations or tape between the two connected lottery tickets of such strip or strips. The ticket cutter 440*a* is controlled by the burster controller and/or the controller of the ticket vending machine 100. In this example embodiment, the ticket cutter 440*a* is inwardly positioned (i.e., positioned downstream) from the ticket inlet 422*a*. After the ticket cutter 440*a* cuts the lottery ticket requested by the purchaser from the respective ticket drawer, the ticket drawer can retract the portion of the next lottery ticket from the ticket burster 400*a* before the ticket burster 400*a* moves from the ticket receipt position aligned with that ticket drawer. In other embodiments, the ticket burster 400*a* can be configured such that the ticket cutter is positioned closer to or on the other side of the ticket inlet (i.e., positioned upstream of the ticket inlet) such that after the ticket cutter cuts the lottery ticket along the perforations or tape connecting that lottery ticket to the next lottery ticket, the ticket drawer may not need to withdraw the next lottery ticket or may only need to withdraw the next lottery ticket a relatively small distance. The position, size, and configuration of the ticket cutter can thus vary in accordance with the present disclosure.

In other embodiments, the ticket burster 400*a* can be configured such that the burster housing 402*a* is rotatable about a horizontal axis to separate (via a tearing and/or twisting motion) each lottery ticket along the perforations connecting that lottery ticket to the next lottery ticket. In such embodiments, the ticket drawer may not need to withdraw the next lottery ticket or may only need to withdraw the next lottery ticket a relatively small distance. In such embodiments, the ticket burster may not need a ticket cutter.

It should be appreciated that the ticket burster 400*a* is thus configured to burst the perforations or tape between the lottery ticket being dispensed and the next lottery ticket so as to enable the dispensed lottery ticket to be dispensed into the ticket receptacle 250. This prevents a person from improperly tearing a lottery ticket or being able to pull an extended number of lottery tickets from one or more of the ticket packs in one of the ticket drawers. It should be appreciated that the ticket burster 400*a* can be moved to a dispensing location for each lottery ticket dispensed, or for only certain of the lottery tickets dispensed. It should also be appreciated that the ticket burster can moved to a different location for any lottery ticket that is deemed to be bad or non-dispensable for any reason, and to deposit that ticket into a suitable rejection area.

It should be appreciated that the ticket vending machine of the present disclosure can have more than one ticket burster for each ticket drawer column such that they can operate at the same time, or such that one or more ticket bursters are back-ups in case there is an issue with one of the other ticket bursters for that ticket drawer column.

The ticket engagers 450*a* in this example embodiment include multiple driven rollers (not labeled) and multiple guide rollers (not labeled). The driven rollers are rotated by suitable actuators (not shown) under the control of the burster controller and/or the controller of the ticket vending machine 100. The driven rollers and the guide rollers are configured to move (such as by pulling) and guide each lottery ticket along the ticket movement path and out of the ticket outlet 424*a*. In alternative embodiments, the ticket engagers are configured to grip and pull each lottery ticket from the respective ticket drawer.

The burster controller (not shown) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster 400*a*. The burster controller can be hard wired or wirelessly connected to and in communication with the cutter 440*a*, the actuators for the driven rollers 450*a*, any actuators of the ticket burster 400*a* that cause the movement of the ticket burster 400*a* as further described below. In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be hard wired to or wirelessly connected to and in communication with the cutter, the actuators for the driven rollers, any actuators on the ticket burster or the burster supporter that cause the movement of the ticket burster, and the tape sensor(s).

In this example embodiment, the tape sensors 432*a* and 432*b* of the ticket burster 400*a* are positioned in and supported by the housing 402*a* of the ticket burster 400*a*. The tape sensors 432*a* and 432*b* are positioned to detect the tape (such as one or more of the indicators of the tape) on any adjacent pair of lottery tickets that move through the ticket burster 400*a* as that lottery ticket moves below the tape sensors 432*a* and 432*b*. In this example embodiment, the tape sensors 432*a* and 432*b* are above the ticket movement path and thus scan downwardly toward the adjacent lottery tickets to have a full view of the tape on the lottery tickets (assuming that the tape is on the upper sides of the lottery tickets). In other alternative embodiments that are not shown, the tape sensors 432*a* and 432*b* can be below the ticket movement path and thus scans upwardly toward the adjacent lottery tickets. In other alternative embodiments that are not shown, the tape sensors 432*a* and 432*b* can be above and below the ticket movement path and thus scans upwardly and downwardly toward the adjacent lottery tickets. In other embodiments, only one tape sensor is employed. In other embodiments, more than two tape sensors are employed.

In other embodiments that are not shown, a tape sensor can extend transversely along the entire or substantially the entire width of the ticket burster such that it can obtain an image of the entire width of the edge area of each adjacent pair or lottery tickets that move through the ticket burster as that lottery ticket moves above the tape sensor. In this example embodiment, the tape sensor is below the ticket movement path and thus scans upwardly toward the adjacent lottery tickets. In other alternative embodiments that are not shown, the tape sensor is above the ticket movement path and thus scans downwardly toward the adjacent lottery tickets. Such tape sensors are configured to obtain an image of the edge areas as the lottery tickets move from the ticket drawer into the ticket burster. In other words, the tape sensor is configured to scan the edge area of the lottery tickets as the lottery tickets moves in the ticket movement path and through a scan area above the tape sensor.

The tape sensor(s) such as tape sensors 432*a* and 432*b* are configured to communicate tape related data (regarding any sensed tape or the edge area of two adjacent tickets) to the burster controller and/or the controller of the ticket vending machine 100. The burster controller and/or the controller of the ticket vending machine 100 are configured to receive and use and/or analyze this data and determine if the edge area of the lottery tickets includes tape.

If the burster controller and/or the controller of the ticket vending machine 100 determine that the edge area of the lottery ticket is without any tape, the burster controller and/or the controller of the ticket vending machine 100 does not need to take any tape related actions.

If the burster controller and/or the controller of the ticket vending machine 100 determine that the edge area of the lottery ticket includes tape, the burster controller and/or the controller of the ticket vending machine 100 can take one or more of a series of different tape related actions.

The present disclosure contemplates that in various situations, it would be beneficial for the operators and/or controllers of the lottery ticket vending machines to be alerted when two adjacent lottery tickets are connected by tape. The present disclosure contemplates that this tape recognition can be used by the lottery ticket vending machine and/or the operator thereof to know that a ticket for a new lottery game may be the next ticket from a ticket drawer (and to thus expect a new bar code for the next ticket from that ticket drawer). The present disclosure contemplates that the lottery ticket vending machine can ready itself for that new information regarding the next lottery ticket.

The present disclosure also contemplates that the tape recognition can additionally facilitate and simplify the loading process for lottery ticket packs taped together. The present disclosure contemplates that in certain instances the lottery ticket vending machine may not need require front end data input from the operator loading such tickets and thus the lottery ticket machine can better facilitate the loading process due to the tape detection. In other words, the lottery ticket vending machine can ready itself to expect the next ticket that is connected by tape to possibly be a from a new or different lottery ticket pack and thus better facilitate the loading process for addition lottery ticket packs.

The present disclosure further contemplates that the lottery ticket vending machine can slow down movement of the lottery tickets through the burster base on the tape information. In various such embodiments, the action can include the controller(s) causing the cutter of the burster to rotate at a different speed (such as faster) to ensure that the cutter cuts the tape to separate the lottery ticket from the next lottery ticket.

It should thus be appreciated that in various different embodiments, the respective action taken can vary and can include but is not limited to any one or more of the following example actions: (1) cause a display of a message on a display device of the vending machine 100 to alert an operator of the vending machine 100 regarding the tape issue to enable the operator to act on such tape issue if desired or necessary; (2) send a message to a remote monitoring device separate from the vending machine regarding the tape issue; (3) cause the controller of the lottery ticket vending machine to ready itself for the upcoming information regarding the next ticket; and/or (4) automatically address the tape issue in one or more other manners such as described above.

It should be appreciated that the information regarding the tape connecting two lottery tickets can additionally be used for verifying that the two lottery tickets connected by the tape are suitably related (such as for the same lottery game) or are not suitably related (such as not being for the same lottery game) and thus can lead to an incorrect lottery ticket dispensing condition.

It should be appreciated that by scanning the edge areas of each pair of adjacent lottery tickets that move through the burster for tape, the vending machine will be able to catch and cause any such tape related issues to be properly addressed before such tape related issues cause any lottery ticket dispensing issues.

An example method of operation of the ticket vending machine 100 is now described. It should be appreciated that the following example is not the only method of operation of the ticket vending machine of the present disclosure, and other methods of operation are within the scope of the present disclosure. It should also be appreciated that the operations are controlled by the controller of the ticket vending machine and/or the controller of the ticket bursters, and that the descriptions provided below of the steps are controlled by such controllers.

This example is when a purchaser desires to purchase a single instant lottery ticket from the ticket vending machine 100. Responsive to and after the purchaser selects the instant lottery ticket (from the plurality of different instant lottery tickets available from the ticket vending machine 100) using the purchaser interface component(s) and specifically using one or more of the input devices and one or more of the payment acceptors to select and pay for the instant lottery ticket, the ticket vending machine 100 generally causes the ticket burster 400*a* to obtain and dispense that instant lottery ticket into the ticket collection receptacle 250. More specifically, this includes: (1) moving the ticket burster 400*a* into a ticket receipt position associated with and in alignment with the ticket drawer of the ticket draw column 300*a* that holds the instant lottery ticket pack of the selected type of instant lottery ticket requested by the purchaser; (2) causing the ticket drawer to feed a leading edge of the leading (such as the top most) instant lottery ticket of the pack in that ticket drawer into the ticket inlet 422*a* of the ticket burster 400*a* (with the front face of the instant lottery ticket facing upwardly); (3) causing the ticket engagers 450*a* to engage and cause that instant lottery ticket to move along the ticket movement path of the ticket burster 400*a*; (4) at the appropriate time when the edge area of that lottery ticket and the next lottery ticket passes through a scan area adjacent to the tape sensor (such as tape sensors 432*a* and 432*b*) sense the edge area of those lottery tickets, and send data to the burster controller and/or the controller of the ticket vending machine 100; (5) at the appropriate time when the perforations or tape connecting that lottery ticket to the next lottery ticket of that strip or the next strip are aligned with the ticket cutter 440*a*, causing the ticket cutter 440*a* or to cut the perforations or tape and thus separate that lottery ticket from the next instant lottery ticket in the strip or the next strip; (6) causing the ticket drawer to retract any portion of that next instant lottery ticket of the strip or the next strip from the ticket burster 400*a*; (7) causing the ticket burster 400*a* to move into alignment with the ticket collection receptacle 250; and (8) causing the ticket engagers 450*a* to move the separated instant lottery ticket along the ticket movement path toward and out of the ticket outlet 424*a*, and into the ticket collection receptacle 250. The method can include the controller of the ticket vending machine 100 also sending suitable data related to the dispensed instant lottery ticket to a central lottery server (not shown) for verification of that instant lottery ticket for possible subsequent redemption.

If the burster controller and/or the controller of the ticket vending machine 100 determines based on the data that the edges of two the lottery tickets are connected by tape (such as the lottery tickets LT1 and LT2 shown in FIGS. 1A and 1B), the burster controller and/or the controller of the ticket vending machine 100 can take one or more of the series of actions described above. In various embodiments, since the ticket vending machine 100 is regularly monitoring the dispensed lottery tickets, the ticket vending machine 100 will often be able to detect a tape issue before the issue becomes an issue that causes the ticket vending machine to shut down and stop dispensing lottery tickets.

In various other embodiments, the tape sensors can be positioned on each of the drawers instead of or in addition to the ticket bursters.

In various embodiments, the tape sensor includes a camera configured to take one or more images of the edge area of the adjacent lottery tickets, create data based on the image(s), and send the data to the controller(s) for analysis.

In various embodiments, the tape sensor includes a plurality of adjacent optical sensors configured obtain data, and send the data to the controller(s) for analysis.

In various embodiments, the tape sensor includes a compact image sensor ("CIS") reader that is configured to read bar codes on the lottery tickets and additionally also configured to obtain image data for detecting tape connecting two lottery tickets.

It should also be appreciated from the above that the movable ticket burster of the present disclosure can replace the multiple stationary dispensing devices that are respectively mounted in front of each of the respective ticket drawers in various known lottery ticket vending machines. It should also be appreciated that by eliminating the multiple stationary dispensing devices, a greater quantity of ticket drawers can be employed than in various known lottery ticket vending machines.

It should be appreciated from the above that various embodiments of the present disclosure provide a lottery ticket vending machine including: (1) a housing; (2) a ticket drawer column in the housing, the ticket drawer column including a plurality of ticket drawers, each of the ticket drawers configured to hold one or more strips of lottery tickets; (3) a ticket burster in the housing, the ticket burster defining a ticket inlet and a ticket outlet, the ticket burster movable to a plurality of different ticket receipt positions, each different ticket receipt position associated with and in alignment with a different one of the ticket drawers; (4) a tape sensor supported by the ticket burster, configured to obtain data for adjacent lottery tickets that move from one of the ticket drawers into the ticket burster, and configured to transmit the data; and (5) a controller configured to receive the data from the tape sensor, determine if tape is connected to the adjacent lottery tickets and cause an action to be taken responsive to determining that the tape is connected to the lottery tickets. In various such embodiments, the tape sensor includes a camera configured to obtain and transmit the data to the controller. In various such embodiments, the tape sensor comprises an optical sensor configured to obtain and create the data. In various such embodiments, the tape sensor includes a plurality of optical sensors configured to obtain and create the data. In various such embodiments, the tape sensor is positioned in the ticket burster such that the tape sensor is configured to sense the edge area of the adjacent lottery tickets before a cutter of the ticket burster cuts the tape connecting the adjacent lottery tickets. In various such embodiments, the lottery ticket vending machine includes a display device and wherein the action includes causing a display by the display device of an indication of a tape issue. In various such embodiments, the action includes causing a ticket cutter of the ticket burster to rotate at a different rate. In various such embodiments, the tape sensor is configured to detect an indicator of the tape connected to the adjacent lottery tickets.

It should further be appreciated from the above that various embodiments of the present disclosure provide a lottery ticket vending machine including: (1) a housing; (2) a ticket drawer column in the housing, the ticket drawer column including a plurality of ticket drawers, each of the ticket drawers configured to hold one or more strips of lottery tickets; (3) a ticket burster in the housing, the ticket burster defining a ticket inlet and a ticket outlet, the ticket burster movable to a plurality of different ticket receipt positions, each different ticket receipt position associated with and in alignment with a different one of the ticket drawers; (4) a ticket cutter supported by the ticket burster; (5) a tape sensor supported by the ticket burster, configured to obtain data for adjacent lottery tickets that move from one of the ticket drawers into the ticket burster, and configured to transmit the data, wherein the tape sensor comprises one of a camera and an optical sensor, wherein the tape sensor is positioned in the ticket burster such that the tape sensor can sense tape connecting the adjacent lottery tickets before the cutter cuts the tape connecting the adjacent lottery tickets; and (5) a controller configured to receive the data from the tape sensor, determine if the adjacent lottery tickets are connected by the tape based on the data, and cause an action to be taken responsive to determining that the lottery tickets are connected by tape. In various such embodiments, the lottery ticket vending machine includes a display device and wherein the action comprises causing a display by the display device of an indication of a tape issue. In various such embodiments, the tape sensor is configured to detect an indicator of the tape connected to the adjacent lottery tickets. In various such embodiments, the action includes causing the ticket cutter to rotate faster to cut the tape.

It should be appreciated from the above that various embodiments of the present disclosure provide a lottery ticket vending machine including: (1) a housing; (2) a lottery ticket drawer supported by the housing; (3) a ticket burster supported by the housing; (4) a sensor supported by the housing; and (5) a controller supported by the housing, the controller configured to operate with the sensor to determine if a first lottery ticket is connected to a second lottery ticket by tape, and to cause an action to be taken responsive to determining that the first and second lottery tickets are connected by tape. In various such embodiments, the sensor is configured to detect an indicator of the tape connected to the first and second lottery tickets. In various such embodiments, the action includes sending a message to a remote device. In various such embodiments, the action includes changing rotational speed of a cutter. In various such embodiments, the lottery ticket vending machine includes a display device, wherein the action comprises a display by the display device of an alert indicating that the first and second lottery tickets are connected by the tape. In various such embodiments, the sensor includes a camera configured to obtain an image of the edge area. In various such embodiments, the sensor is configured to create the edge area data relating to image of the edge area of the first and second lottery tickets. In various such embodiments, the sensor includes a plurality of optical sensors configured to create the data.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket vending machine comprising:
- a housing;
- a ticket drawer column in the housing, the ticket drawer column comprising a plurality of ticket drawers, each of the ticket drawers configured to hold one or more strips of lottery tickets;
- a ticket burster in the housing, the ticket burster defining a ticket inlet and a ticket outlet, the ticket burster movable to a plurality of different ticket receipt positions, each different ticket receipt position associated with and in alignment with a different one of the ticket drawers;
- a tape sensor supported by the ticket burster, configured to obtain data for adjacent lottery tickets that move from one of the ticket drawers into the ticket burster, and configured to transmit the data; and
- a controller configured to receive the data from the tape sensor, determine if tape is connected to the adjacent lottery tickets and cause an action to be taken responsive to determining that the tape is connected to the lottery tickets.

2. The lottery ticket vending machine of claim 1, wherein the tape sensor comprises a camera configured to obtain and transmit the data to the controller.

3. The lottery ticket vending machine of claim 1, wherein the tape sensor comprises an optical sensor configured to obtain and create the data.

4. The lottery ticket vending machine of claim 1, wherein the tape sensor comprises a plurality of optical sensors configured to obtain and create the data.

5. The lottery ticket vending machine of claim 1, wherein the tape sensor is positioned in the ticket burster such that the tape sensor is configured to sense the edge area of the adjacent lottery tickets before a cutter of the ticket burster cuts the tape connecting the adjacent lottery tickets.

6. The lottery ticket vending machine of claim 1, which comprises a display device and wherein the action comprises causing a display by the display device of an indication of a tape issue.

7. The lottery ticket vending machine of claim 1, wherein the action comprises causing a ticket cutter of the ticket burster to rotate at a different rate.

8. The lottery ticket vending machine of claim 1, wherein the tape sensor is configured to detect an indicator of the tape connected to the adjacent lottery tickets.

9. A lottery ticket vending machine comprising:
- a housing;
- a ticket drawer column in the housing, the ticket drawer column comprising a plurality of ticket drawers, each of the ticket drawers configured to hold one or more strips of lottery tickets;
- a ticket burster in the housing, the ticket burster defining a ticket inlet and a ticket outlet, the ticket burster movable to a plurality of different ticket receipt positions, each different ticket receipt position associated with and in alignment with a different one of the ticket drawers;
- a ticket cutter supported by the ticket burster;
- a tape sensor supported by the ticket burster, configured to obtain data for adjacent lottery tickets that move from one of the ticket drawers into the ticket burster, and configured to transmit the data, wherein the tape sensor comprises one of a camera and an optical sensor, wherein the tape sensor is positioned in the ticket burster such that the tape sensor can sense tape connecting the adjacent lottery tickets before the cutter cuts the tape connecting the adjacent lottery tickets; and
- a controller configured to receive the data from the tape sensor, determine if the adjacent lottery tickets are connected by the tape based on the data, and cause an action to be taken responsive to determining that the lottery tickets are connected by tape.

10. The lottery ticket vending machine of claim 9, which comprises a display device and wherein the action comprises causing a display by the display device of an indication of a tape issue.

11. The lottery ticket vending machine of claim 9, wherein the tape sensor is configured to detect an indicator of the tape connected to the adjacent lottery tickets.

12. The lottery ticket vending machine of claim 9, wherein the action comprises causing the ticket cutter to rotate faster to cut the tape.

13. A lottery ticket vending machine comprising:

a housing;

a lottery ticket drawer supported by the housing;

a ticket burster supported by the housing;

a sensor supported by the housing; and a controller supported by the housing, the controller configured to operate with the sensor to determine if a first lottery ticket is connected to a second lottery ticket by tape, and to cause an action to be taken responsive to determining that the first and second lottery tickets are connected by tape.

14. The lottery ticket vending machine of claim 13, wherein the sensor is configured to detect an indicator of the tape connected to the first and second lottery tickets.

15. The lottery ticket vending machine of claim 13, wherein the action comprises sending a message to a remote device.

16. The lottery ticket vending machine of claim 13, wherein the action comprises changing rotational speed of a cutter.

17. The lottery ticket vending machine of claim 13, which comprises a display device, wherein the action comprises a display by the display device of an alert indicating that the first and second lottery tickets are connected by the tape.

18. The lottery ticket vending machine of claim 13, wherein the sensor comprises a camera configured to obtain an image of the edge area.

19. The lottery ticket vending machine of claim 13, wherein the sensor is configured to create the edge area data relating to image of the edge area of the first and second lottery tickets.

20. The lottery ticket vending machine of claim 13, wherein the sensor comprises a plurality of optical sensors configured to create the data.

* * * * *